July 9, 1929.  G. F. H. HICKS  1,720,075
CLUTCH PEDAL CONTROL
Filed Jan. 24, 1927

INVENTOR
G. F. H. HICKS
BY
ATTORNEYS

Patented July 9, 1929.

1,720,075

UNITED STATES PATENT OFFICE.

GEORGE F. H. HICKS, OF AURORA, ILLINOIS.

CLUTCH-PEDAL CONTROL.

Application filed January 24, 1927. Serial No. 163,259.

My invention relates to improvements in clutch pedal controls, and it consists in the combinations, constructions, and arrangements herein described and claimed.

An object of my invention is to provide a clutch pedal control which is especially adapted for planetary transmissions, such as those used by the Ford automobile, in which the clutch pedal is operative in more than one position.

A further object is to provide a clutch pedal control which automatically stops or checks a clutch pedal in its neutral position.

A further object is to provide a clutch pedal control which may be readily attached to the frame of an automobile and adjusted so as to maintain the most effective result.

Other objects and advantages will appear in the following specification, and the novel features of the invention will be particularly pointed out in the appended claims.

Figure 1:
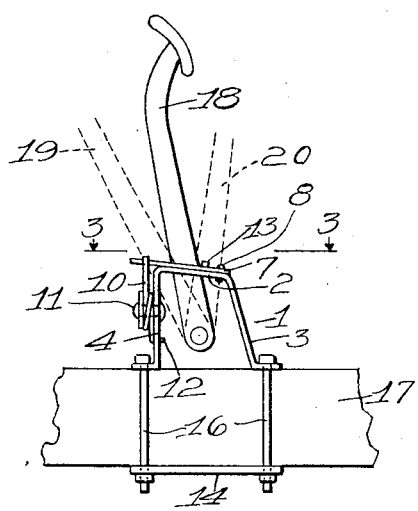
Figure 2:
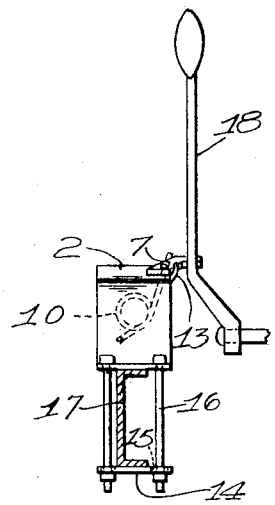
Figure 3:
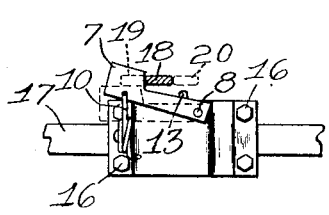
Figure 4:
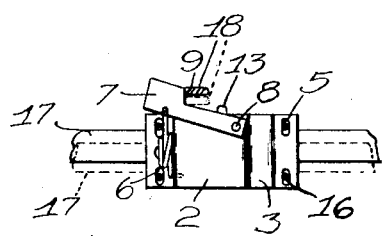

My invention is illustrated in the accompanying drawings, forming part of this application, in which Figure 1 is a side elevation of my device as applied to a frame of an automobile, Figure 2 is a front elevation of my device, Figure 3 is a section substantially along the line 3—3 of Figure 1, showing the clutch pedal in its effective positions, and Figure 4 is a plan view of my device, showing the manner in which it may be adjusted to the clutch pedal.

In carrying out my invention I provide a frame 1 having a transversely extending upper portion 2, a front wall 3, and a rear wall 4. The lower extremities of the walls 3 and 4 are bent outwardly and provided with elongated openings 5 and 6, respectively.

A latch 7 is pivotally mounted upon the upper portion 2 at 8. The latch 7 is provided with a slightly tapering clutch-pedal-engaging surface 9. A coil spring 10 is secured to the rear wall 4 by means of a spring holder 11. One end of the spring 10 is bent inwardly and extends through an opening in the rear wall at 12. The free end of the spring engages with the latch 7 and tends to force the latch outwardly against a stop 13 which is integral with the upper portion 2 of the frame 1. A bottom plate 14 is provided with elongated openings 15 and adapted to receive bolts 16.

I have shown a frame member 17 and a clutch pedal 18. The clutch pedal, as shown in Figures 1 and 3 in full lines, is in neutral position. When the clutch pedal is in the position shown in dotted lines at 19, it is in low speed position, and when the clutch pedal is in the position shown in dotted lines at 20, it is in high speed position. In applying the device to the frame member 17, the frame 1 is placed upon the upper surface of the frame member 17. The bottom plate 14 is held beneath the frame member 17 and the bolts 16 inserted in place through the openings 5 and 15. Before tightening the bolts, the frame 1 and the bottom plate 14 may be moved toward or away from the clutch 18 so as to gain the desired position of the latch with respect to the clutch pedal. The latch 7 must be so positioned with respect to the clutch pedal 18 that when the clutch pedal engages with the clutch-pedal-engaging surface 9 the clutch pedal will be in neutral position. When the frame 1 and the bottom plate 14 have been adjusted to their desired positions, the bolts 16 may then be tightened for rigidly holding the frame 1 and the bottom plate 14 against displacement.

Figure 4 illustrates the manner in which the frame 1 together with the bottom plate 14 may be moved with respect to the frame member 17 by the aid of the elongated openings 5 and 15. In this manner the latch 7 may be positioned to suit the operator; i. e., if the operator was a relatively strong man it would require more resistance to check the clutch pedal 18 in neutral position than if the operator was a woman. This is varied by moving the latch 7 toward or away from the clutch pedal. If the operator wishes considerable resistance the frame is moved toward the clutch pedal so that the pedal will engage with the latch at the innermost point of the engaging surface 9. To lessen the resistance the frame 1 and latch are moved away from the clutch pedal.

From the foregoing description of the various parts of the device, the operation thereof may be readily understood. Let us assume that the clutch pedal 18 is in its high speed position, that shown at 20, and the operator wishes to disengage the clutch by moving the clutch pedal 18 into its neutral position. With the ordinary planetary transmission it is necessary that the operator guess at what is the neutral position. It is therefore possible with the aid of the latch 7 to automatically stop the movement of the clutch pedal 18 in neutral position. The operator may readily move the clutch pedal 18 into the low speed position shown at 19 by exerting additional force to the clutch pedal, thus disengaging the clutch pedal with the latch 7. The necessary force required to move the clutch pedal 18 from its neutral position into its low speed position is sufficient to force the latch 7 against the tension of the spring 10, and sufficient to release the clutch pedal.

I claim:

1. A device of the type described comprising a frame having upright portions connected by a transversely extending central portion, a latch having a tapered contacting surface pivotally mounted upon the central portion of said frame at one edge thereof, a stop member carried by the central portion of said frame for limiting the movement of said latch in one direction, and spring means carried by one of said uprights for forcing said latch outwardly toward said stop member.

2. A device of the type described comprising a frame having upright portions connected by a transversely extending central portion, a latch having a tapered contacting surface pivotally mounted upon the central portion of said frame at one edge thereof, a stop member carried by the central portion of said frame for limiting the movement of said latch in one direction, means for adjustably securing said frame to an automobile having a clutch pedal, said latch tending to stop the movement of said clutch pedal in one direction and at a predetermined position, and a spring carried by one of said uprights for normally holding said latch outwardly toward said stop.

GEORGE F. H. HICKS